(12) United States Patent
Medra et al.

(10) Patent No.: US 10,135,540 B2
(45) Date of Patent: Nov. 20, 2018

(54) SYSTEM AND METHOD FOR FASTER-THAN-NYQUIST (FTN) TRANSMISSION

(71) Applicants: Ahmed Mohamed Ibrahim Medra, Kanata (CA); Jeebak Mitra, Ottawa (CA); Lutz Hans-Joachim Lampe, Vancouver (CA)

(72) Inventors: Ahmed Mohamed Ibrahim Medra, Kanata (CA); Jeebak Mitra, Ottawa (CA); Lutz Hans-Joachim Lampe, Vancouver (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 15/485,272

(22) Filed: Apr. 12, 2017

(65) Prior Publication Data
US 2017/0302383 A1 Oct. 19, 2017

Related U.S. Application Data

(60) Provisional application No. 62/322,078, filed on Apr. 13, 2016.

(51) Int. Cl.
*H04B 10/516* (2013.01)

(52) U.S. Cl.
CPC ................. *H04B 10/516* (2013.01)

(58) Field of Classification Search
CPC ............. H04L 1/005; H04L 27/01; H04L 2025/03414; H04B 1/0475; H04B 10/516
See application file for complete search history.

(56) References Cited

U.S. PATENT DOCUMENTS 8,514,966 B2   8/2013 Wajcer et al.

OTHER PUBLICATIONS

Kim et al. Binary faster than Nyquist optical transmission via non-uniform power allocation;Jun. 18-21, 2013;Canadian Workshop on Information Theory; pp. 180-185.*

(Continued)

*Primary Examiner* — Rahel Guarino (57) ABSTRACT

Systems and methods are disclosed that attempt to increase spectral efficiency by using Faster-than-Nyquist (FTN) transmission. In one embodiment, a method at a transmitter includes partitioning bits into K bit streams, obtaining K power scaled symbol streams, combining the K power scaled symbol streams to obtain a stream of transmission symbols, and transmitting the stream of transmission symbols using FTN signaling. At the receiver, the received symbols are partitioned into K symbol streams, and demodulation and decoding is performed by: (i) demodulating and decoding the $K^{th}$ symbol stream of the K symbol streams to obtain a $K^{th}$ set of bits; (ii) mapping the $K^{th}$ set of bits to a $K^{th}$ set of symbols; and (iii) for each one of k=K−1, ..., 1: demodulating and decoding a $k^{th}$ symbol stream of the K symbol streams to obtain a $k^{th}$ set of bits. The demodulating and decoding includes performing interference cancellation.

18 Claims, 7 Drawing Sheets

(56) References Cited

OTHER PUBLICATIONS

J. Anderson, F. Rusek, and V. Owall, "Faster-than-Nyquist signaling," IEEE Proceedings, vol. 101, No. 8, pp. 1817-1830, Aug. 2013.

A. Barbieri, D. Fertonani, and G. Colavolpe, "Time-frequency packing for linear modulations: Spectral efficiency and practical detection schemes," IEEE Trans. Commun., vol. 57, No. 10, pp. 2951-2959, Oct. 2009.

A. M. G. Colavolpe, T. Foggi and A. Piemontese, "Faster-than-Nyquist and beyond: How to improve spectral efficiency by accepting interference," Opt. Express, vol. 19, pp. 26 600-26 609, Dec. 2011.

Y. Kim and J. Bajcsy, "Binary faster than Nyquist optical transmission via non-uniform power allocation," in 13th Canadian Wkshp. on Info. Theory, pp. 180-185, Jun. 2013.

A. Liveris and C. Georghiades, "Exploiting faster-than-Nyquist signaling," IEEE Trans. Commun., vol. 51, No. 9, pp. 1502-1511, Sep. 2003.

L. Poti, G. Meloni, G. Berrettini, F. Fresi, M. Secondini, T. Foggi, G. Colavolpe, E. Forestieri, A. D'Errico, F. Cavaliere, R. Sabella, and G. Prati, "Casting 1 Tb/s DP-QPSK communication into 200 GHz bandwidth," in 38th European Conf. and Exh. on Opt. Commun., pp. 1-3 Sep. 2012.

Ahmed M. Medra, Lutz Lampe, and Jeebak Mitra, "Generalized Multi-Stream Faster-than-Nyquist Transmission with Symbol-by-Symbol Detection", Advanced Photonics Congress 2016, Jul. 16, 2016.

Kim et al., "Binary Faster than Nyquist Optical Transmission via Non-uniform Power Allocation", Information Theory (CWIT), 2013 13th Canadian Workshop on Information Theory, Jun. 18-21, 2013, pp. 180-185.

Chang et al., "Tomlinson Harashima Precoding with Soft Detection for Faster than Nyquist DP-16QAM Coherent Optical Systems", Mar. 22-26, 2015, pp. 1-3.

\* cited by examiner

SYSTEM AND METHOD FOR FASTER-THAN-NYQUIST (FTN) TRANSMISSION

PRIORITY

The present application claims priority to U.S. Provisional Patent Application Ser. No. 62/322,078, entitled "System and Method for Faster-than-Nyquist (FTN) Transmission", which was filed on Apr. 13, 2016, and which is incorporated herein by reference.

FIELD

The following relates to transmitting and receiving Faster-than-Nyquist (FTN) signals.

BACKGROUND

In a communication system, data is sent from a transmitter, over a channel, to a receiver. For example, data may be routed from one part of the world to another through one or more networks, where each network includes network entities connected by channels. When the data is to be transmitted from a first network entity to a second network entity, a transmitter in the first network entity transmits the data to a receiver in the second network entity over the channel connecting the transmitter to the receiver. In an optical network, the channel may be an optical channel having one or more optical fibers.

As the demand for data increases, there is a desire to transmit more data over a channel. The spectral efficiency of a channel refers to the information rate that can be transmitted over a given bandwidth on the channel. It is desired to increase the data rate through a corresponding increase in spectral efficiency.

One technique to try to increase the spectral efficiency is to use a higher order modulation, which means increasing the number of bits represented by a single symbol transmitted over the channel. However, this has potential downfalls. For example, in the context of an optical communication system, using a higher order modulation often requires using a higher launch power. Higher launch powers may lead to enhanced non-linearity impairment, and so there may be a power constraint on the launch power. Using a higher order modulation may also require an analog-to-digital converter (ADC) and a digital-to-analog (DAC) converter that have a higher resolution. There may be increased noise at a high sampling rate because the DAC/ADC combination may behave like a low pass filter with limited bandwidth that tends to cut the signal and introduce inter-symbol interference. Also, transmissions using higher order modulation may be more sensitive to power imbalance in the I and Q branches and/or may be more sensitive to skew between the I and Q branches.

Another technique is to try to increase the data rate by increasing the baud rate by shortening the transmission period of each symbol. This also has potential downfalls. For example, in the context of an optical communication system, a signal with higher baud rate may face impairments due to the optical filters. Also, wavelength selective switches, multiplexers, demultiplexers, and other network elements in an optical network often have limited bandwidth and a roll-off that may be too sharp to accommodate the higher baud rate.

SUMMARY

Systems and methods are disclosed that attempt to increase spectral efficiency by using Faster-than-Nyquist (FTN) transmission. FTN transmission may result in an increase in spectral efficiency without increasing modulation order and without increasing the transmission bandwidth.

In one embodiment, there is provided a method performed at a transmitter. The method may include partitioning a plurality of bits into K bit streams. The method may further include obtaining K power scaled symbol streams by, for each one of $k=1, \ldots K$: encoding a $k^{th}$ bit stream of the K bit streams using a respective forward error correction encoder to obtain a $k^{th}$ encoded bit stream, mapping the $k^{th}$ encoded bit stream to respective symbols to obtain a $k^{th}$ symbol stream, and applying a respective power factor to the $k^{th}$ symbol stream to obtain a $k^{th}$ power scaled symbol stream. The method may further include combining the K power scaled symbol streams to obtain a stream of transmission symbols. The method may further include transmitting the stream of transmission symbols using FTN signaling.

In another embodiment, there is provided a corresponding method performed at a receiver. The method may include partitioning a plurality of received symbols into K symbol streams. Each one of the K symbol streams was transmitted using FTN signaling at a respective power. The method may further include performing demodulation and decoding of the K symbol streams by: (i) demodulating and decoding the $K^{th}$ symbol stream of the K symbol streams to obtain a $K^{th}$ set of bits, the $K^{th}$ symbol stream having been transmitted at a power greater than a power at which at least one other of the K symbol streams was transmitted; (ii) mapping the $K^{th}$ set of bits to a $K^{th}$ set of symbols; and (iii) for each one of $k=K-1, \ldots, 1$: demodulating and decoding a $k^{th}$ symbol stream of the K symbol streams to obtain a $k^{th}$ set of bits.

In some embodiments, the demodulating and decoding may include performing interference cancellation using sets of symbols mapped from bits obtained from demodulating and decoding at least one of the $(k+1)^{th}$ to $K^{th}$ symbol streams of the K symbol streams.

Corresponding transmitters and receivers are also disclosed.

Other aspects and features will become apparent to those of ordinary skill in the art upon review of the following description.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Introduction

Figure 1:
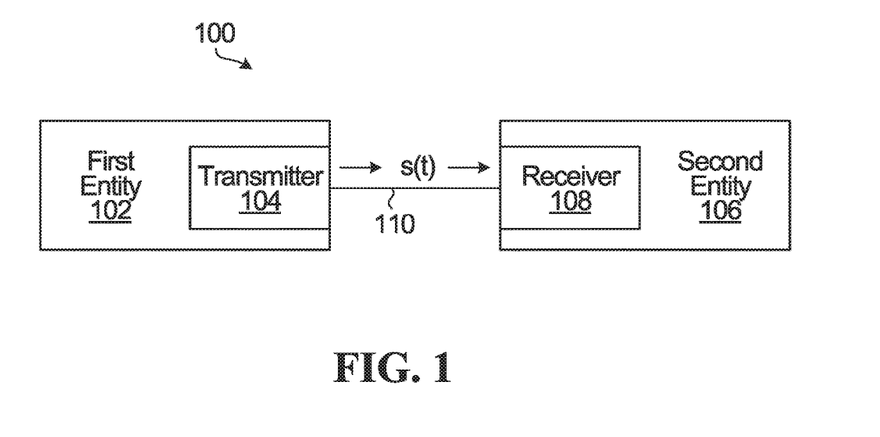
FIG. 1 is a block diagram of a communication system, according to one embodiment.

FIG. 1 is a block diagram of a communication system 100, according to one embodiment. The communication system 100 includes a first entity 102 having a transmitter 104, and a second entity 106 having a receiver 108. The transmitter 104 and the receiver 108 are connected by a channel 110. A data transmission s(t) is sent from the transmitter 104 to the receiver 108 over the channel 110. The data transmission may be represented as follows:

$$s(t) = \sum_n a[n]h(t-nT)$$

where s(t) is the data signal transmitted over the channel 110, a[n] is a sequence of data symbols transmitted by the data signal s(t), and h(t) is a pulse of duration T seconds. T may be referred to as the symbol time. The pulse h(t) is orthogonal with respect to shifts by nT, which means that the product of the pulse and the time-inverted complex conjugated version of the pulse, offset by an integer number of symbol times, has integral zero. The orthogonal pulses h(t) may be considered "invisible" to each other, which may make optimal detection at the receiver 108 possible in a symbol-by-symbol way with a filter matched to h(t) and a sampler.

However, in embodiments described below, FTN signaling is instead employed. FTN signaling is a linear modulation scheme that aims to increase spectral efficiency by reducing the time and/or frequency spacing between two adjacent pulses, thus introducing controlled inter-symbol and/or inter-carrier interference, by dispensing with the need for orthogonal transmission.

When FTN is utilized, as in the embodiments below, the data transmission may instead be represented as follows:

$$s(t) = \sum_n a[n]h(t-\tau nT)$$

where $0<\tau<1$ is the time acceleration factor. $\tau=1$ for Nyquist signaling, but for FTN signaling $0<\tau<1$.

To mitigate the interference introduced into the data transmission s(t) by the use of FTN signaling, different detection techniques may be implemented at the receiver 108.

In embodiments described below, generalized multi-stream (GMS) FTN transmission methods and systems are disclosed that reduce the spacing between adjacent samples in the time-domain. The transmitted signal s(t) consists of the superposition of multiple independent streams to which a suitable power allocation is applied. Due to the different power loading values, the transmitted signal s(t) may exhibit higher peak-to-average power ratio (PAPR) compared to FTN signaling with single-stream transmission. The transmitted signal is band-limited using a transmit pulse. At the receiver 108, an iterative multi-stage demodulating and decoding method is implemented that performs symbol-by-symbol detection using soft-symbol interference cancellation. In embodiments in which the receiver 108 is an optical receiver, the symbol-by-symbol detection occurs after optical impairment compensation.

Some previous approaches for detection at the receiver 108 have used maximum a posteriori probability (MAP) or maximum likelihood sequence estimate (MLSE) equalizer to try to address the interference introduced by the FTN signaling. However. MAP and MLSE equalizers are typically trellis based and require sequential processing. The implementation complexity of MAP equalizers is $O(M^L)$, where M is the constellation size and L is the effective inter-symbol interference (ISI) memory introduced by the FTN signaling. Depending upon the time acceleration factor τ, the ISI memory may be large. In embodiments below, systems and methods for symbol-by-symbol detection are disclosed that may have lower complexity compared to MAP and MLSE.

Example Transmitter and Receiver

Figure 2:
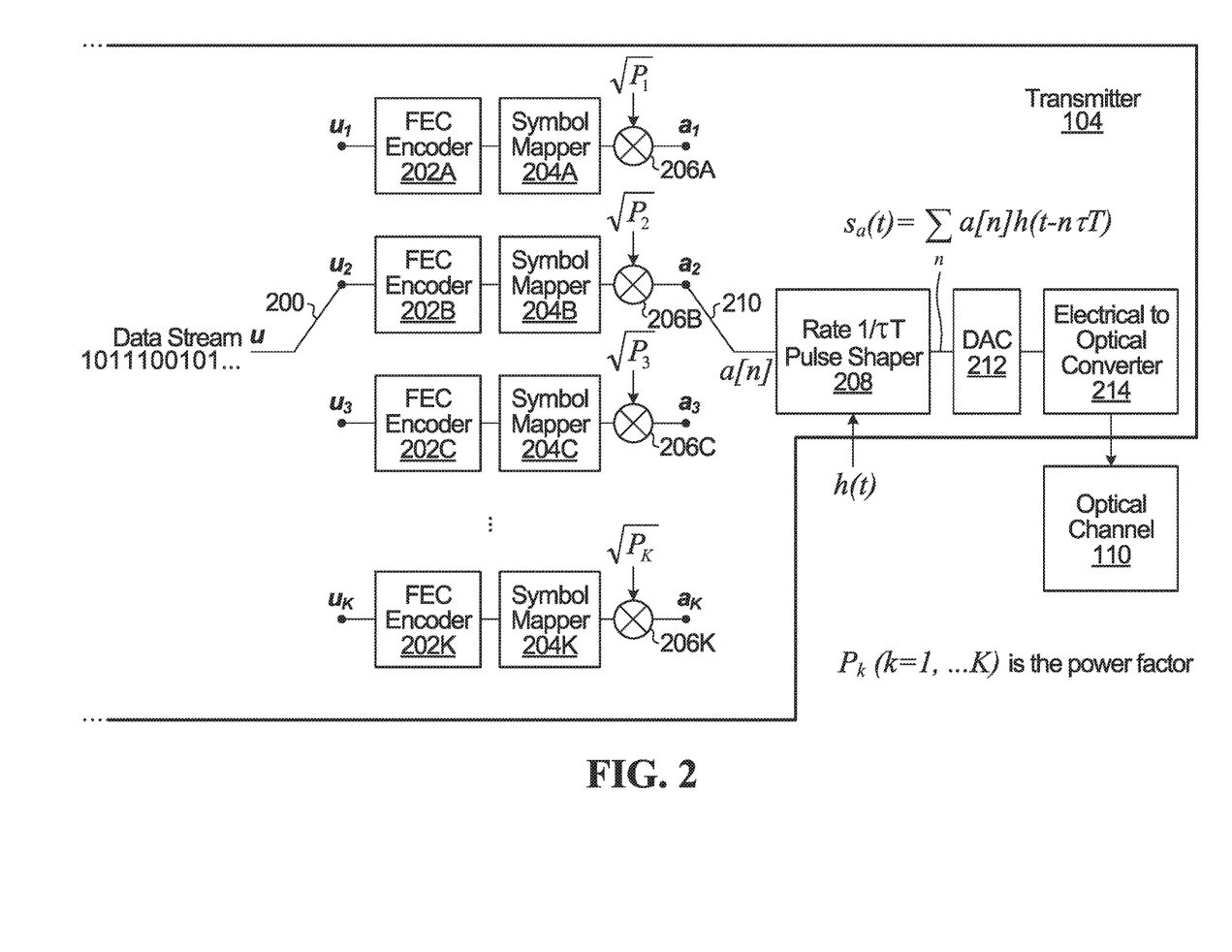
FIG. 2 is a block diagram of the transmitter from FIG. 1, illustrating one example implementation.

FIG. 2 is a block diagram of the transmitter 104 from FIG. 1, illustrating one example implementation. In this example implementation, it is assumed that the communication system 100 is a coherent optical communication system. The channel 110 is illustrated as an optical channel.

The transmitter 104 includes K branches. Each branch is coupled to a bit stream u via a switch 200. Each branch has a respective forward error correction (FEC) encoder, labelled 202A-202K. Connected to each FEC encoder is a respective symbol mapper, labelled 204A-204K. Connected to each symbol mapper is a respective power scaling element, labelled 206A-206K. Each power scaling element performs a multiplicative operation in which a symbol is multiplied by the square root of a power factor. The power factor is sometimes called a power loading factor. The output of each branch is coupled to pulse shaper 208 via a switch 210. The pulse shaper is connected to a digital-to-analog (DAC) converter 212. The DAC 212 is connected to an electrical-to-optical converter 214.

The FEC encoders 202A-K, symbol mappers 204A-K, power scaling elements 206A-K, and pulse shaper 208 may each be implemented using a processor that executes instructions to cause the processor to perform the respective operations of the FEC encoders 202A-K, symbol mappers 204A-K, power scaling elements 206A-K, and pulse shaper 208. The same processor or different processors may be used to implement each component. Alternatively, the FEC encoders 202A-K, symbol mappers 204A-K, power scaling elements 206A-K, and pulse shaper 208 may each be dedicated circuitry, such as an application specific integrated circuit (ASIC), a graphics processing unit (GPU), or a programmed field programmable gate array (FPGA) for performing the respective operations of the FEC encoders 202A-K, symbol mappers 204A-K, power scaling elements 206A-K, and pulse shaper 208. One set of circuitry may be dedicated to implementing all of the FEC encoders 202A-K, symbol mappers 204A-K, power scaling elements 206A-K, and pulse shaper 208. Alternatively, different circuitry may be used to implement one or some of the FEC encoders 202A-K, symbol mappers 204A-K, power scaling elements 206A-K, and pulse shaper 208. The DAC 212 may be implemented using a dedicated DAC chip. The electrical-to-optical converter 214 may be implemented using dedicated circuitry for converting a signal from the electrical to optical domain, such as an optical modulator.

In operation, a plurality of bits u, that is to be transmitted, is partitioned into K streams: $u_1, u_2, \ldots, u_K$. Each stream is sent to a respective one of the K branches. The streams $u_1, u_2, \ldots, u_K$ may be created by partitioning bits u in a round-robin fashion using the switch 200. Bit stream $u_1$ is encoded using FEC encoder 202A to result in an encoded bit stream, and the encoded bit stream is then modulated by symbol mapper 204A, using a bijective mapping scheme, to obtain a symbol stream. The power factor $P_1$ is then applied to the symbol stream to result in a power scaled symbol stream $a_1$. Power factor $P_1$ is applied in this embodiment by multiplying the symbol stream by the square root of $P_1$, as illustrated. An equivalent operation occurs in each one of the other branches for the other streams $u_2, \ldots, u_K$.

Because the bits are partitioned into K streams, the clocking of the FEC encoders 202A-K can be slower compared to not partitioning the bits, due to the parallel processing. This may reduce computational complexity.

In general, the coding and the modulation of each one of the K streams may be independent from the remaining streams. For example, the encoding applied by FEC encoder 202A may be different from the encoding applied by FEC encoder 202B, and/or the modulation performed by symbol mapper 204A may be different from the modulation performed by symbol mapper 204B. However, in this embodiment, the same FEC code is used and the same symbol mapping is used for each branch. That is, each FEC encoder 202A-K applies the same FEC code, and the same modulation scheme is used by each symbol mapper 204A-K. For example, a low-density parity-check (LDPC) code may be used by each FEC encoder 202A-K, and quadrature amplitude modulation (QAM) may be used by each symbol mapper 204A-K.

For each stream $u_k$, where k=1, 2, ..., K, a respective power factor $P_k$ is applied after FEC encoding and symbol mapping to generate the stream $a_k$. To maintain the same average transmitted power $P_{av}$ as uniform power loading, the power factors $P_k$ may be selected such that $P_1 + P_2 + \ldots + P_K = P_{av}$, and $P_K \geq P_{K-1} \geq \ldots \geq P_1$. Therefore, stream $a_1$ has the lowest power factor $P_1$ applied, and stream $a_K$ has the highest power factor $P_K$ applied. $P_K$ has the largest magnitude, $P_{K-1}$ has the second largest magnitude, ..., and $P_1$ has the smallest magnitude. As will be clear from the variations discussed later, this is only one possible way of setting the power factors.

After the power factors are applied, the symbols of each stream $a_k$, k=1, 2, ..., K, are then concatenated using switch 210 to generate the stream of transmitted symbols a[n]. Specifically, a symbol from each stream $a_k$ is selected using switch 210 in a round robin fashion, at the symbol-rate, to generate the stream of transmission symbols:

$$a[n] = \{a_{11}, a_{21}, \ldots, a_{K1}, a_{12}, a_{22}, \ldots, a_{K2}, \ldots, a_{1N}, a_{2N}, \ldots, a_{KN}\},$$

where $a_{kj}$ denotes the $j^{th}$ symbol in the $k^{th}$ stream, and N is the number of symbols per stream.

The stream of transmission symbols a[n] are then pulse-shaped using transmit pulses h(t) that are T-orthogonal. T-orthogonal pulses means that the pulses are orthogonal with respect to shifts by nT in time. However, FTN signalling is used, and therefore the rate at which the symbols a[n] are pulse-shaped is $1/T' = 1/\tau T$, where $\tau$ is the time acceleration factor and $0 < \tau < 1$.

Accordingly, the FTN transmitted signal takes the form $$s_a(t) = \sum_n a[n]h(t - n\tau T)$$

Digital-to-analog conversion in DAC 212 is then performed, followed by electrical-to-optical conversion in electrical-to-optical converter 214, and the optical version of the FTN signal $s_a(t)$ is transmitted through the optical channel 110.

Figure 3:
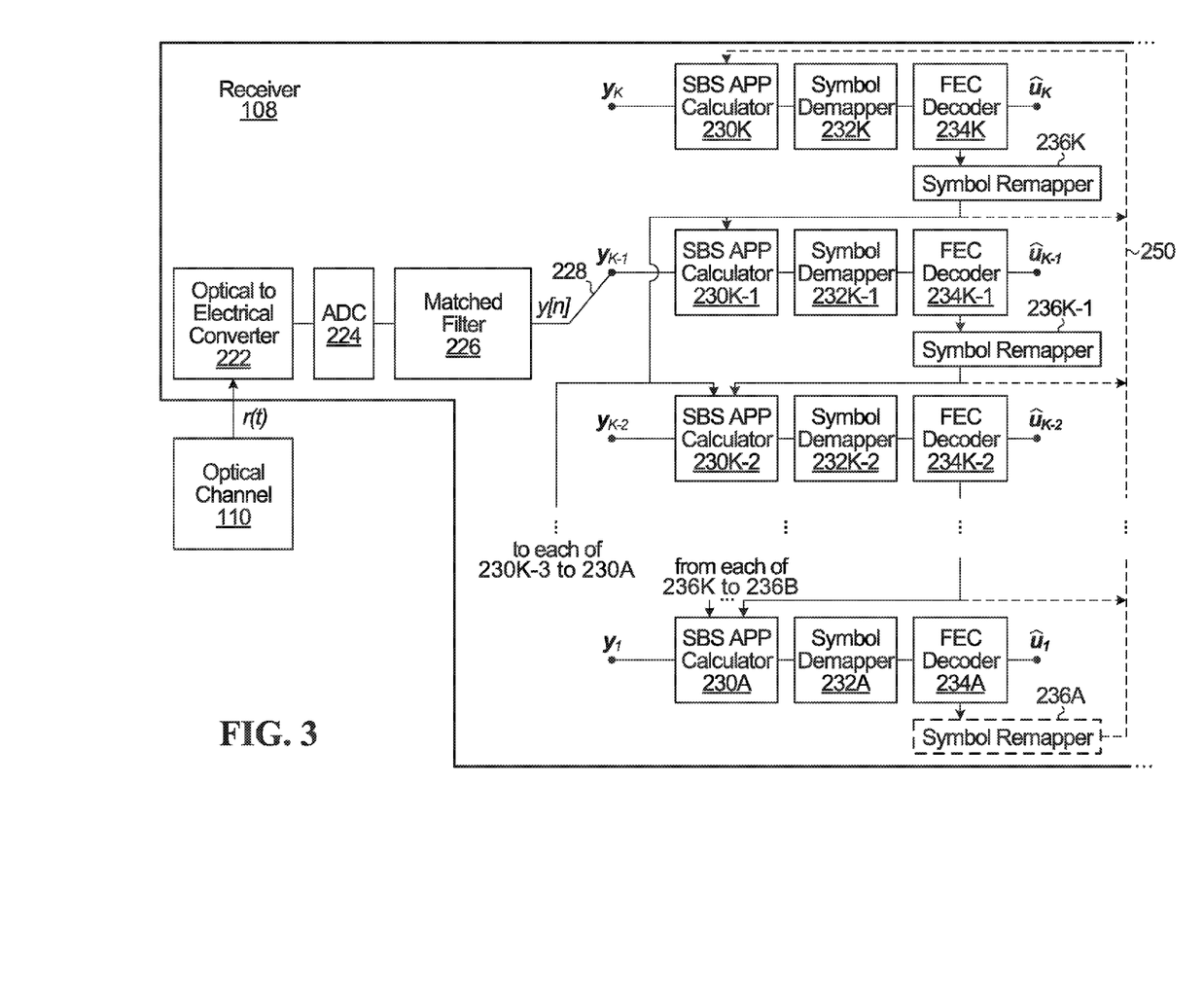
FIG. 3 is a block diagram of the receiver from FIG. 1, illustrating one example implementation.

FIG. 3 is a block diagram of the receiver 108 from FIG. 1, illustrating an example implementation in which the receiver 108 corresponds to the transmitter in FIG. 2.

The receiver 108 includes an optical-to-electrical converter 222, connected to an analog-to-digital converter (ADC) 224, which is connected to a matched filter 226. Alternatively, the matched filter 226 may be before the ADC 224, in which case the matched filtering would be performed in the analog domain.

The receiver 108 also includes K branches. Each branch is coupled to the output of the matched filter 226 via a switch 228. Each branch has a respective symbol-by-symbol a priori probability (SBS APP) calculator, labelled 230A-K. Connected to each SBS APP calculator is a respective symbol demapper, labelled 232A-K. Connected to each symbol demapper is a respective FEC decoder, labelled 234A-K. The output of each FEC decoder is connected to a respective symbol remapper, labelled 236A-K.

The optical-to-electrical converter 222 may be implemented using dedicated circuitry for converting a signal from the optical to electrical domain, such as a photo diode. The ADC 224 may be implemented using a dedicated ADC chip. The matched filter 226, SBS APP calculators 230A-K, symbol demappers 232A-K, FEC decoders 234A-K, and symbol remappers 236A-K may each be implemented using a processor that executes instructions to cause the processor to perform the respective operations of the matched filter 226, SBS APP calculators 230A-K, symbol demappers 232A-K, FEC decoders 234A-K, and symbol remappers 236A-K. The same processor or different processors may be used to implement each component. Alternatively, the matched filter 226, SBS APP calculators 230A-K, symbol demappers 232A-K, FEC decoders 234A-K, and symbol remappers 236A-K may each be dedicated circuitry, such as an ASIC, a GPU, or an FPGA for performing the respective operations of the matched filter 226, SBS APP calculators 230A-K, symbol demappers 232A-K, FEC decoders 234A-K, and symbol remappers 236A-K. One set of circuitry may be dedicated to implementing all of the matched filter 226, SBS APP calculators 230A-K, symbol demappers 232A-K, FEC decoders 234A-K, and symbol remappers 236A-K. Alternatively, different circuitry may be used to implement one or some of the matched filter 226, SBS APP calculators 230A-K, symbol demappers 232A-K, FEC decoders 234A-K, and symbol remappers 236A-K.

In operation, the transmitted signal is distorted in the optical channel 110 by impairments, such as chromatic dispersion. Other noise, such as that due to amplified spontaneous emission, is also present. For embodiments in which dual polarized transmission is used, the signal may be further impaired by polarization mode dispersion (PMD). However, in embodiments in which dual polarized transmission is used, a 2×2 butterfly equalizer (not illustrated), that employs least-mean square (LMS) adaptation of equalizer taps, may be implemented at the receiver 108 to try to mitigate the PMD.

At the receiver 108, optical-to-electrical conversion by optical-to-electrical converter 222 is first performed, followed by analog-to-digital conversion by ADC 224. Coherent detection of the received signal is performed. The coherent detection includes matched-filtering to the transmit pulse h(t) (using matched filter 226) and sampling at a rate of $1/\tau T$, to obtain a sampled-output y[n], given by:

$$y[n] = \int_{-\infty}^{\infty} r(t)h(t - n\tau T)dt = \sum_m a[m]g[n - m] + z[n]$$

where $$g[n] = \int_{-\infty}^{\infty} h(t)h(t-n\tau T)dt$$

is the sampled autocorrelation function of h(t), and z[n] is the noise sequence after matched filtering and sampling with noise variance $\sigma^2$. The matched filtering may include chromatic dispersion compensation.

The received sequence y[n] is then partitioned into K streams $y_1, y_2, \ldots, y_K$ in a round robin fashion using switch 228, the same way as the data u was partitioned at the transmitter 104. Specifically, the sequence y[n] is partitioned into K streams as follows: $y_k[n]=y[K(n-1)+k]$ for $k=1, 2, \ldots, K$ and $n=1, 2, \ldots, N$.

Demodulation and decoding then proceeds in K stages, as follows. Demodulation and decoding of the $K^{th}$ symbol stream, $y_K$, first begins in the $K^{th}$ branch. Demodulation and decoding of the $K^{th}$ symbol stream begins first because $y_K$ corresponds to the symbol stream that was transmitted with the largest power. Specifically, $y_K$ corresponds to stream $a_K$, and the largest magnitude power factor $P_K$ was applied to stream $a_K$. For each symbol in $y_K$, the demodulating and decoding proceeds as follows. The SBS APP calculator 230K first computes the symbol-by-symbol a priori probability for the symbol. This is accomplished by using the updated probabilities of the bits generated from the FEC decoder during the previous iterations, assuming there are global iterations (as shown in stippled line 250 in FIG. 3). The a priori probabilities are initialized to zeros. i.e. equally probable, during the first iteration (or if there are no global iterations) because no information is available regarding the bits from the FEC for the very first iteration (or if there are no global iterations). These probabilities are used to compute the variance of the noise and residual ISI, $\sigma^2$, that corrupts the current stream, and the a posteriori probability of a symbol is proportional to $$\exp\left(-\frac{(y[n]-a[n])^2}{\sigma^2}\right).$$

The output of SBS APP calculator 230K is then sent to symbol demapper 232K, which determines and outputs the log-likelihood ratios (LLRs) for each bit of the symbol. The LLRs are then input to FEC decoder 234K, which generates more reliable estimates of the transmitted bits by FEC decoding, possibly in the form of output LLRs or hard decision bits corresponding to the symbol. The symbol remapper 236K then remaps the output of the FEC decoder 234K back to a corresponding symbol in the constellation, and the remapped symbol is sent to SBS APP calculator K-1. In FIG. 3, the demodulator comprises the SBS APP calculator and the symbol demapper, and the decoder comprises the FEC decoder.

Demodulation and decoding of the $(K-1)^{th}$ symbol stream, $y_{K-1}$, begins next in the $(K-1)^{th}$ branch. $y_{K-1}$ corresponds to the symbol stream that was transmitted with the second largest power. For each symbol in $y_{K-1}$, the demodulating and decoding proceeds in the same way as the $K^{th}$ branch, but with the following exception: soft interference cancellation is performed by subtracting, from $y_{K-1}$, the remapped symbols from the $K^{th}$ branch. Soft interference cancellation is performed by removing the ISI contribution of the symbols of the $K^{th}$ branch from the overall received signal. Using the soft demodulated symbols of the $K^{th}$ branch, the estimate of the channel ISI due to the $K^{th}$ stream, denoted by $K_{ISI}$, is regenerated within the decoder (by convolving the symbols of the $K^{th}$ stream with the channel). This $K_{ISI}$ is then subtracted from the overall received signal thereby removing the interference effect of the $K^{th}$ stream on the overall received signal. This helps eliminate ISI that is present due to the $K^{th}$ branch, and the operation occurs just prior to computing the symbol-by-symbol a priori probability in the SBS APP calculator 230K-1. The SBS APP calculator 230K-1 then computes the a priori probabilities of the signal after the subtraction.

Demodulation and decoding of each subsequent stream in each subsequent branch occurs, from the $(K-2)^{th}$ branch to the $1^{st}$ branch, with soft interference cancellation using remapped symbols from all preceding branches being performed.

When the most powerful, i.e. the strongest, signal stream $y_K$ is decoded, the other streams $y_{K-1}$ to $y_1$ are considered interference. As is clear from FIG. 3, once signal stream $y_K$ is decoded, the decoded bits are mapped back to the symbols corresponding to the decoded bits, and then the symbols are subtracted off when decoding the other streams $y_{K-1}$ to $y_1$. Similarly, when signal stream $y_{K-1}$ is decoded, the other streams are considered interference, and once signal stream $y_{K-1}$ is decoded, the decoded bits are mapped back to the symbols corresponding to the decoded bits, and then the symbols are subtracted off when decoding the other streams $y_{K-2}$ to $y_1$. This process continues until $y_1$ is decoded.

The demodulation and decoding method described above has a potential benefit in that complexity may be reduced because joint decoding of all branches is not being performed. Instead of joint decoding, sequential decoding of each stream is performed using information from a previously decoded stream. This may have reduced decoding complexity compared to joint decoding of all streams. Also, the demodulation and decoding method described above takes advantage of the relative power differential between the streams.

At a given iteration, the equalization algorithm is activated with a set of a priori probabilities obtained from the FEC decoder. The extrinsic probabilities may be computed using the same algorithm described as in Section VI of "Time-Frequency Packing for Linear Modulations: Spectral Efficiency and Practical Detection Schemes" by A. Barbieri, D. Fertonani, and G. Colavolpe, published in *IEEE Trans. Commun.*, vol. 57, no. 10, pp. 2951-2959, October 2009 ("the Barbieri et al. paper").

Global iterations of the demodulation and decoding process may be performed, as indicated by arrow 250. Arrow 250 is stippled to indicate that global iterations are optional. Similarly, symbol remapper 236A is indicated using stippled lines, as it is only used when there are global iterations. Whenever a global iteration is performed, the remapped symbols from the $1^{st}$ to $(K-1)^{th}$ branches in the previous iteration are used for soft interference cancellation in the $K^{th}$ branch in the current iteration. Although global iterations are optional, the illustrated embodiment may be well suited to implement global iterations from the perspective of acceptable complexity because joint decoding of the branches is not performed, which may reduce the decoding latency and therefore may leave enough time to perform multiple iterations. The number of global iterations may be set by a system designer, or the receiver 108 may determine whether or not to perform one or more global iterations during operation based on the output of the decoded bits (e.g. using a syndrome). When a smaller time acceleration factor is used, more global iterations may be required or desired. However, the overall complexity may still be less than MAP equalization.

Selecting Power Factors

In the embodiment described above, the magnitude of power applied to each stream increases for each stream, such that the smallest magnitude of power is applied to stream 1, and the largest magnitude of power is applied to stream K. In one implementation, power allocation to each stream $a_K$ is computed as follows: for a given error correction code that achieves error-free performance at a signal-to-interference-plus-noise ratio $\rho$, then the power factor $P_k$ for the $k^{th}$ stream is computed as $$P_k = \frac{\rho\left(\sigma^2 + \sum_{i=1}^{k-1}\sum_{m=-\infty}^{m=\infty} |g[mK+i]|^2 P_{k-i}\right)}{|g[0]|^2(1+\rho) - \rho\sum_{m=-\infty}^{m=\infty} |g[mK]|^2}$$

$\sigma^2$ is noise variance of the channel. Starting with a chosen value $P_1$, successive evaluations may be performed until $P_k$ is obtained. Alternatively, for $k=2, \ldots, K$, the power factor $P_k$ may be chosen as:

$$P_k \geq \frac{\rho\left(\sigma^2 + \sum_{i=1}^{k-1}\sum_{m=-\infty}^{m=\infty} |g[mK+i]|^2 P_{k-i}\right)}{|g[0]|^2(1+\rho) - \rho\sum_{m=-\infty}^{m=\infty} |g[mK]|^2}$$

that is, $P_k$ may be chosen as any value greater or equal to the value computed on the right hand side of the equation.

The power factor equation above is different from the formulation in "Binary faster than Nyquist optical transmission via non-uniform power allocation," by Y. Kim and J. Bajcsy, and published in 13th Canadian Workshop on Information Theory, June 2013, pp. 180-185 ("the Kim et al. paper"). In particular, the power factor equation above addresses intra-stream interference that may occur and that was avoided in the scheme proposed in the Kim et al. paper. In the scheme proposed in the Kim et al. paper, the value of $\tau$ is restricted to 1/K, which may be restrictive for system design. The value of $\tau$ is not restricted to 1/K in the present embodiment.

In another embodiment, the power factors $P_k$ may be chosen such that the overall achievable rate is maximized, e.g., in a similar fashion to the method described in the Barbieri et al. paper. Choosing the power factors in this way may involve performing a power sweep in the power range and choosing power factors iteratively, considering a fixed number of streams, until the overall achievable rate is maximized. Choosing the power factors in this way may result in better performance than using the equation above. However, choosing the power factors such that the achievable rate is maximized may require using a different modulation and coding rate for each stream $a_K$.

In another embodiment, a heuristic approach is used as follows: the equation $$P_k = \frac{\rho\left(\sigma^2 + \sum_{i=1}^{k-1}\sum_{m=-\infty}^{m=\infty} |g[mK+i]|^2 P_{k-i}\right)}{|g[0]|^2(1+\rho) - \rho\sum_{m=-\infty}^{m=\infty} |g[mK]|^2}$$

is used to select the power factor for the stream having the strongest (largest magnitude) power factor, assuming a large number of streams. The power factor for all the other streams is then chosen as a same lower value assuming uniform power allocation.

More generally, the power factors do not all have to be different values, and/or it does not have to be the case that each stream has a power factor applied that has a higher magnitude than the previous stream, as in the embodiment of FIGS. 2 and 3. However, it is assumed that at least one of the streams has a power factor applied that is larger in magnitude than a power factor applied to another stream.

Simulations

Simulations were performed in order to consider the effect of different power loading scenarios. The simulations were performed with root-raised cosine (RRC) pulse shaping with excess bandwidth=0.22. The FEC code used was the standard low-density parity-check (LDPC) Digital Video Broadcast-Satellite-Second Generation (DVB-S2) code with codeword length of 64800 bits.

Since different powers are allocated to different pulse streams, the peak-to-average power ratio (PAPR) increases compared to uniform power allocation. Two design parameters that affect the PAPR are number of streams K and FTN time acceleration factor $\tau$.

The FTN parameter $\tau$ was chosen such that for a given coding rate, the target spectral efficiency of 2 bits/s/Hz/polarization was achieved. Thus, for the coding rates of 3/4, 4/5, 5/6, and 8/9, the corresponding values of $\tau$ were 0.61, 0.66, 0.68, and 0.73 respectively. Dual polarized quarternary phase shift keying (DP-QPSK) transmission was considered through an optical fiber of length 1000 km, with chromatic dispersion parameter $\beta_2=-22.63$ ps$^2$/km and polarization mode dispersion of 0.1 ps/$\sqrt{\text{km}}$.

Figure 4:
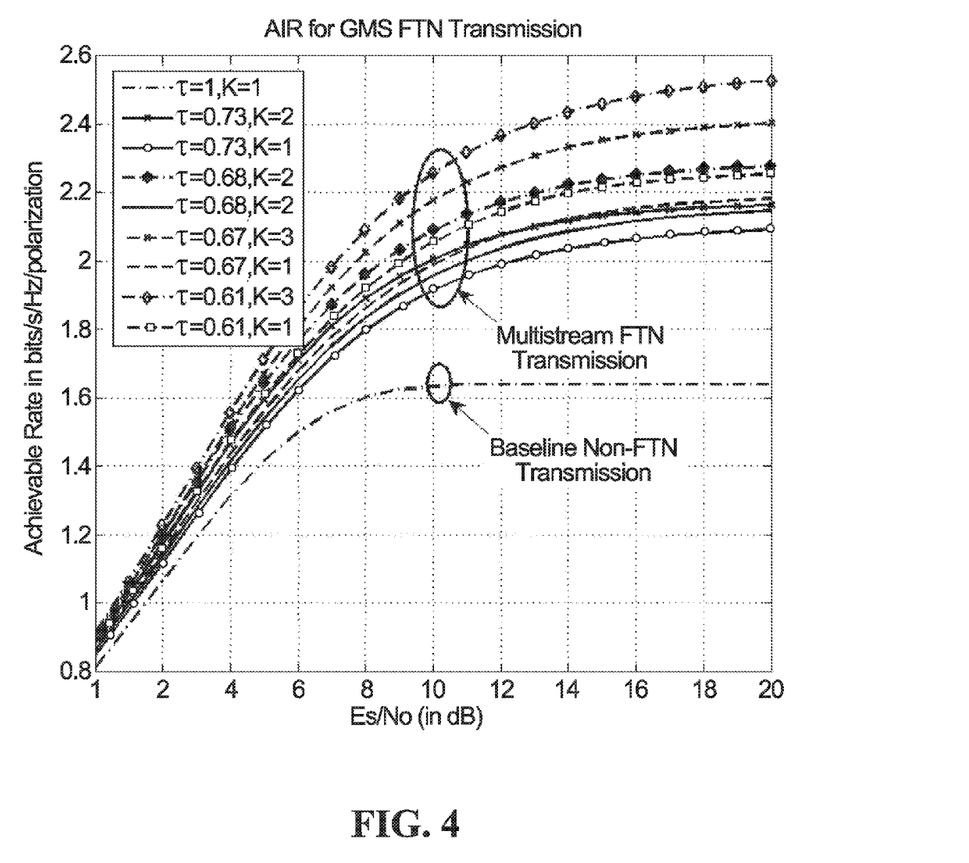
FIGS. 4 to 6 illustrate simulation results.
Figure 5:
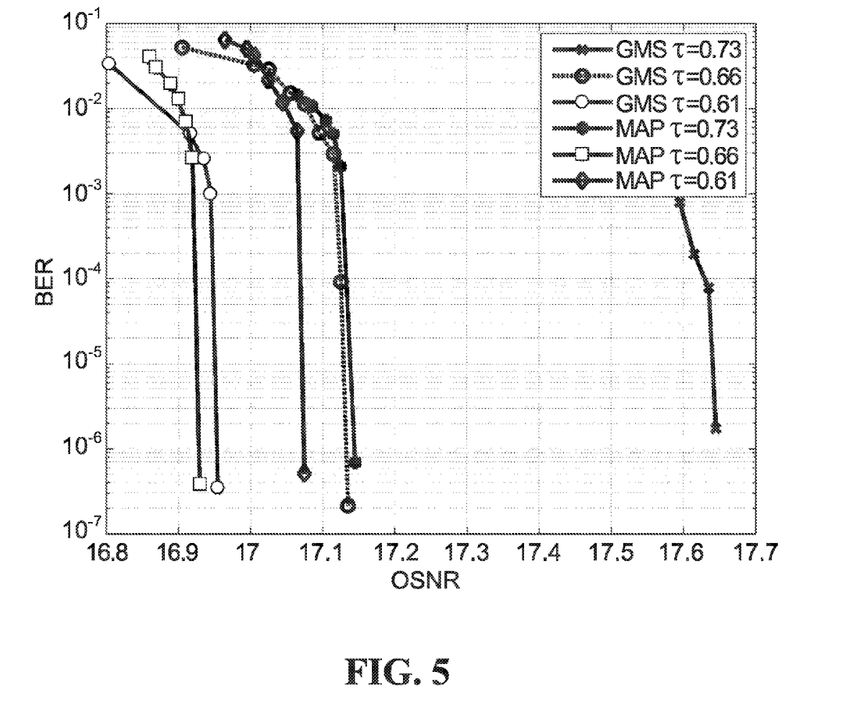
Figure 6:
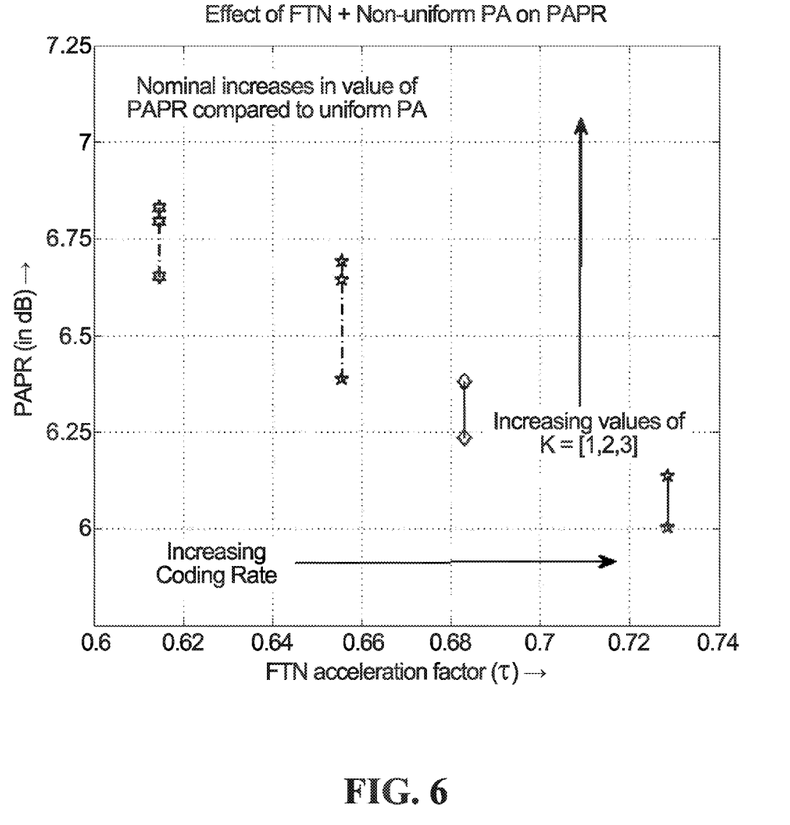

The evaluation in terms of achievable rate is depicted in FIG. 4. Decreasing the value of $\tau$ results in spectral efficiency improvement in comparison to the Nyquist transmission ($\tau=1$; K=1). Further, for a given value of $\tau$, increasing the number of data streams K may lead to additional performance gains compared to the single stream transmission. These performance gains are translated into achieving the same spectral efficiency using lower transmitted power, or equivalently at lower optical signal-to-noise ratio (OSNR), as can be observed from the bit-error rate (BER) curves in FIG. 5. While FTN transmission with MAP equalizer achieves better performance when $\tau=0.73$ and $\tau=0.66$, the GMS scheme achieves better performance when $\tau$ drops to 0.61. Due to different power loading, the performance gain is achieved by FTN transmission with K=3 streams and a low-complexity symbol-by-symbol detection at the receiver. Another key observation is that there is a negligible performance loss when comparing the performance of MAP equalizer and GMS scheme, assuming different tuples of $\tau$ and coding rates, that result in the best performance. Finally, the proposed GMS scheme is evaluated in terms of PAPR as shown in FIG. 6. For a given value of t, increasing the number of streams leads to higher values of PAPR. Also, for a given number of streams, decreasing the value of $\tau$ leads to higher values for the PAPR. These results suggest that there exists a trade-off between the PAPR and the best achievable rate or BER performance. The value of K should be chosen in such a way that a target performance can be achieved using the smallest value of K. Thus, for τ=0.61 and τ=0.66 it was determined that K=3 gives the best BER performance, and for τ=-0.68 and τ=0.73 it was determined that K=2 gives the best BER performance.

Therefore, in some embodiments, there is provided a method of selecting the number of streams K as a function of BER performance and PAPR performance for a given code rate and for a given time acceleration factor τ of the FTN signaling.

Possible benefits of embodiments disclosed herein are as follows. Transmitter/receiver modifications required to implement embodiments disclosed herein are in the digital domain, i.e., changes to the digital signal processing (DSP). Despite the presence of ISI due to the FTN signaling, legacy FECs designed or optimized for Gaussian signaling may still be used, possibly without significant performance loss and no whitening filter (in addition to matched filtering). The computational complexity may be lower compared to some other FTN equalizers, e.g., such as the MAP equalizer disclosed in "Casting 1 Tb/s DP-QPSK communication into 200 GHz bandwidth." by L. Poti, G. Meloni, G. Berrettini, F. Fresi, M. Secondini, T. Foggi. G. Colavolpe, E. Forestieri, A. D'Errico, F. Cavaliere, R. Sabella, and G. Prati, and published in 38th European Conf. and Exh. on Opt. Commun., September 2012, pp. 1-3. Embodiments disclosed herein may be considered flexible in that the number of data streams and FTN signaling may be optimized independently assuming different performance metrics. For example, the smallest number of streams may be chosen that come within a desired margin of the maximum achievable rate at a given FTN signaling rate. Also, different from the scheme in the Kim et al. paper, embodiments disclosed herein do not restrict each stream to be transmitted at Nyquist rate, which allows for a broader range of reasonable time acceleration factors for FTN. Embodiments disclosed herein employ multi-stage symbol-by-symbol detection, which may be considered low complexity, along with a soft-symbol interference cancellation strategy. Decreasing the value of τ may lead to improved spectral efficiencies without sacrificing the complexity. Also, embodiments disclosed herein may increase the spectral efficiency without increasing the launch power and may be robust to limited bandwidth network elements. In embodiments disclosed herein, a FTN signal may be able to be decoded with manageable complexity at the receiver. In embodiments disclosed herein, it may be possible to provide an optimal power loading technique for a generalized multi-stream FTN transmission. In embodiments disclosed herein, it may be possible to provide symbol-by-symbol FTN detection that is applicable to non-binary transmissions. Unlike MAP/MLSE equalizers, the detection method in embodiments disclosed herein may be independent of the time acceleration factor. Using the symbol-by-symbol detection of embodiments disclosed herein may reduce the complexity of the FTN equalizer without much degradation in performance. By increasing spectral efficiency using FTN, as disclosed in some embodiments herein, the baud rate may be reduced and/or less expensive optoelectronics may be used, and this reduced complexity may allow for the receiver architecture to be feasibly implemented in silicon.

Other Example Systems and Methods

The transmitter and receiver described above with respect to FIGS. 2 and 3 is one specific example. Further variations and generalizations are as follows.

Figure 7:
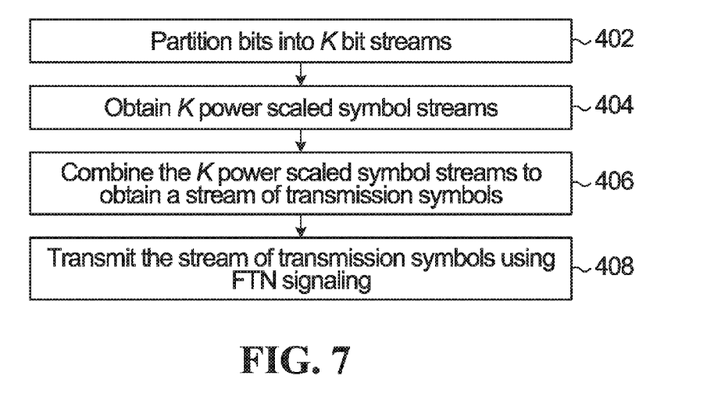
FIG. 7 is a flowchart of operations performed by a transmitter, according to one embodiment.

FIG. 7 is a flowchart of operations performed by a transmitter, according to one embodiment. The transmitter may have any structure that allows for the steps of the method to be performed. The transmitter in FIG. 2 is only one example.

In step 402, bits are partitioned into K bit streams. For example, this may be done using a switch, e.g. as in switch 200 in FIG. 2.

In step 404. K power scaled symbol streams are obtained. One way to do this is described with respect to FIG. 2. In one embodiment, the following operations may be performed: for each one of k=1, . . . K: encoding a $k^{th}$ bit stream of the K bit streams using a respective forward error correction code to obtain a $k^{th}$ encoded bit stream, mapping the $k^{th}$ encoded bit stream to respective symbols to obtain a $k^{th}$ symbol stream, and applying a respective power factor to the $k^{th}$ symbol stream to obtain a $k^{th}$ power scaled symbol stream.

In step 406, the K power scaled symbol streams are combined to obtain a stream of transmission symbols. For example, this may be done using a switch, e.g. as in switch 210 in FIG. 2.

In step 408, the stream of transmission symbols is transmitted using FTN signaling. For example, this may be done using a pulse shaper generating symbols at the rate of 1/τT, e.g. as in pulse shaper 208 in FIG. 2. The pulse shaping may be done in the digital domain for a certain baud rate B, with a shape that is better matched to the channel, such as a root raised cosine (RRC) pulse. The pulse may be represented using several digitized samples and may also have a support that is slightly higher than the required bandwidth of the signal, denoted by an excess bandwidth term α, where α has typical values in the range of 0.1 and 0.5.

In some embodiments, the respective power factor applied to one of the symbol streams has a magnitude larger than the magnitude of the respective power factor applied to another one of the symbol streams. In some embodiments, for each one of k=2, . . . , K: the respective power factor applied to the $k^{th}$ symbol stream has a magnitude no less than the magnitude of the respective power factor applied to the $(k-1)^{th}$ symbol stream. In some embodiments, the respective power factor applied to the $k^{th}$ symbol stream satisfies the relationship $$P_k \geq \frac{\rho\left(\sigma^2 + \sum_{i=1}^{k-1} \sum_{m=-\infty}^{m=\infty} |g[mK+i]|^2 P_{k-i}\right)}{|g[0]|^2(1+\rho) - \rho \sum_{m=-\infty}^{m=\infty} |g[mK]|^2}$$

where $P_k$ is the respective power factor of the $k^{th}$ symbol stream, ρ is a signal-to-interference-plus-noise ratio at which an error control code achieves error-free performance. $\sigma^2$ is noise variance of a channel, and $g[n]=\int_{-\infty}^{\infty} h(t)h(t-n\tau T)dt$, where τ is a time acceleration factor of the FTN signaling, h(t) is a transmit pulse, and T is a duration of the transmit pulse. In some embodiments, K is a function of BER performance and PAPR performance for a given code rate and for a given time acceleration factor τ of the FTN signaling. In some embodiments, the respective forward error correction code is the same for each bit stream of the K bit streams, although this is not necessary. In some embodiments, the respective forward error correction code is a LDPC code, although other FEC codes may be used instead. In some embodiments, mapping the $k^{th}$ encoded bit stream to respective symbols comprises applying QAM, although other modulation schemes may be used instead. In some embodiments, the transmitter is a coherent optical transmitter. However, the embodiments are not limited to an optical environment. The methods described herein equally apply to other communication systems, such as wireless or wireline communication systems that operate in the electrical domain.

Figure 8:
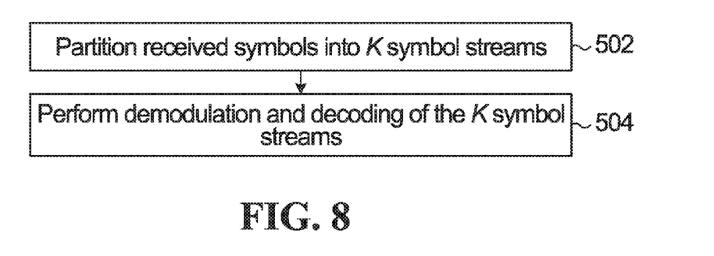
FIG. 8 is a flowchart of operations performed by a receiver, according to one embodiment.

FIG. 8 is a flowchart of operations performed by a receiver, according to one embodiment. The receiver may have any structure that allows for the steps of the method to be performed. The receiver in FIG. 3 is only one example.

In step 502, received symbols are partitioned into K symbol streams. For example, this may be performed using a switch, e.g. switch 228 of FIG. 3. Each one of the symbol streams was transmitted using FTN signaling at a respective power. The respective power that was applied to some of the symbol streams may be the same or different.

In step 504, demodulation and decoding of the K symbol streams is performed. One way to do this is described with respect to FIG. 3. In one embodiment, the following operations may be performed: (i) demodulating and decoding the $K^{th}$ symbol stream of the K symbol streams to obtain a $K^{th}$ set of bits; (ii) mapping the $K^{th}$ set of bits to a $K^{th}$ set of symbols; (iii) for each one of k=K-1, . . . , 1: demodulating and decoding a $k^{th}$ symbol stream of the K symbol streams to obtain a $k^{th}$ set of bits.

In some embodiments, the $K^{th}$ symbol stream was transmitted at a power greater than a power at which at least one other of the K symbol streams was transmitted.

In some embodiments, the demodulating and decoding in (iii) includes: performing interference cancellation using the $(k+1)^{th}$ to $K^{th}$ sets of symbols mapped from bits obtained from demodulating and decoding the $(k+1)^{th}$ to $K^{th}$ symbol streams of the K symbol streams., e.g. as shown in FIG. 3. However, more generally, the interference cancellation does not have to use all of the $(k+1)^{th}$ to $K^{th}$ sets of symbols mapped from bits obtained from demodulating and decoding the $(k+1)^{th}$ to $K^{th}$ symbol streams. In other embodiments, only symbols from some of the previously decoded symbol streams may be used to perform the interference cancellation. For example, in some embodiments, the demodulation and decoding in (iii) includes: performing interference cancellation using at least a set of symbols mapped from bits obtained from demodulating and decoding the $(k+n)^{th}$ symbol stream of the K symbol streams, where n is a value between 1 and K-k. For example, the $(k+n)^{th}$ symbol stream may be a symbol stream that has the most (or a lot) of interference with the current symbols being decoded.

In some embodiments, performing the demodulation and decoding of the K symbol streams may comprise performing N iterations. Each iteration of the N iterations may include steps (i) to (iii). For each one of n=2, . . . , N: step (i) of the $n^{th}$ iteration may comprise demodulating and decoding the $K^{th}$ symbol stream by performing operations including interference cancellation. In some embodiments, the interference cancellation may include using sets of symbols mapped from bits obtained from demodulating and decoding the $1^{st}$ to $K^{th}$ symbol streams during the $(n-1)^{th}$ iteration, e.g. as shown in stippled lines in FIG. 3. More generally, the interference cancellation does not have to use all of the $1^{st}$ to $K^{th}$ symbol streams during the $(n-1)^{th}$ iteration. In other embodiments, only some of the $1^{st}$ to $K^{th}$ symbol streams decoded during the $(n-1)^{th}$ iteration may be used to perform the interference cancellation.

In some embodiments, for each one of k=2, . . . K: the $k^{th}$ symbol stream was transmitted with a magnitude of power no less than the magnitude of the power used to transmit the $(k-1)^{th}$ symbol stream. In some embodiments, the symbol streams each have the same coding and modulation, although this is not necessary. The coding and/or modulation may be different for some or all of the streams. In some embodiments, the symbol streams may each have LDPC coding, and the decoding would comprise performing LDPC decoding. In some embodiments, the symbol streams each have QAM. However, other modulation and/or coding may be used instead.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed at a transmitter comprising:
partitioning a plurality of bits into K bit streams;
obtaining K power scaled symbol streams by, for each one of k=1, . . . K:

encoding a $k^{th}$ bit stream of the K bit streams using a respective forward error correction encoder to obtain a $k^{th}$ encoded bit stream, mapping the $k^{th}$ encoded bit stream to respective symbols to obtain a $k^{th}$ symbol stream, and applying a respective power factor to the $k^{th}$ symbol stream to obtain a $k^{th}$ power scaled symbol stream;

combining the K power scaled symbol streams to obtain a stream of transmission symbols; and transmitting the stream of transmission symbols using Faster-than-Nyquist (FTN) signaling;

wherein for each one of k=2, . . ., K: the respective power factor applied to the $k^{th}$ symbol stream satisfies the relationship $$P_k \geq \frac{\rho\left(\sigma^2 + \sum_{i=1}^{k-1}\sum_{m=-\infty}^{m=\infty} |g[mK+i]|^2 P_{k-i}\right)}{|g[0]|^2(1+\rho) - \rho \sum_{m=-\infty}^{m=\infty} |g[mK]|^2}$$

where $P_k$ is the respective power factor of the $k^{th}$ symbol stream, $\rho$ is a signal-to-interference-plus-noise ratio at which an error control code achieves error-free performance, $\sigma^2$ is noise variance of a channel, and $g[n]=\int_{-\infty}^{\infty} h(t)h(t-n\tau T)\,dt$, where $\tau$ is a time acceleration factor of the FTN signaling, h(t) is a transmit pulse, and T is a duration of the transmit pulse.

2. The method of claim 1, wherein the respective power factor applied to one of the symbol streams has a magnitude larger than a magnitude of the respective power factor applied to another one of the symbol streams.

3. The method of claim 2, wherein for each one of k=2, . . ., K:
the respective power factor applied to the $k^{th}$ symbol stream has a magnitude no less than a magnitude of the respective power factor applied to the $(k-1)^{th}$ symbol stream.

4. The method of claim 1, wherein K is a function of bit error rate (BER) performance and peak-to-average-power ratio (PAPR) performance for a given code rate and for a given time acceleration factor $\tau$ of the FTN signaling.

5. A transmitter comprising:
K branches, each branch of the K branches to receive a respective one of K bit streams, and each branch having a respective forward error correction encoder, a respective symbol mapper, and a respective power scaler;
the transmitter configured to obtain K power scaled symbol streams by, for each one of k=1, . . . K:
encoding a $k^{th}$ bit stream of the K bit streams using the respective forward error correction encoder of a $k^{th}$ branch to obtain a $k^{th}$ encoded bit stream; mapping the $k^{th}$ encoded bit stream to respective symbols using the respective symbol mapper of the $k^{th}$ branch to obtain a $k^{th}$ symbol stream; and applying a respective power factor to the $k^{th}$ symbol stream using the respective power scaler of the $k^{th}$ branch to obtain a $k^{th}$ power scaled symbol stream;
the transmitter further configured to combine the K power scaled symbol streams to obtain a stream of transmission symbols and transmit the stream of transmission symbols using Faster-than-Nyquist (FIN) signaling;
wherein for each one of k=2, . . .,K: the respective power factor to be applied to the $k^{th}$ symbol stream satisfies the relationship $$P_k \geq \frac{\rho\left(\sigma^2 + \sum_{i=1}^{k-1}\sum_{m=-\infty}^{m=\infty} |g[mK+i]|^2 P_{k-i}\right)}{|g[0]|^2(1+\rho) - \rho \sum_{m=-\infty}^{m=\infty} |g[mK]|^2}$$

where $P_k$ is the respective power factor of the $k^{th}$ symbol stream, $\rho$ is a signal-to-interference-plus-noise ratio at which an error control code achieves error-free performance, $\sigma^2$ is noise variance of a channel, and $g[n]=\int_{-\infty}^{\infty} h(t)h(t-n\tau T)\,dt$, where $\tau$ is a time acceleration factor of the FTN signaling, h(t) is a transmit pulse, and T is a duration of the transmit pulse.

6. The transmitter of claim 5, wherein the respective power factor to be applied to one of the symbol streams by the transmitter has a magnitude larger than a magnitude of the respective power factor to be applied to another one of the symbol streams.

7. The transmitter of claim 6, wherein for each one of k=2, . . ., K:
the respective power factor to be applied to the $k^{th}$ symbol stream by the transmitter has a magnitude no less than a magnitude of the respective power factor to be applied to the $(k-1)^{th}$ symbol stream.

8. The transmitter of claim 5, wherein K is a function of bit error rate (BER) performance and peak-to-average-power ratio (PAPR) performance for a given code rate and for a given time acceleration factor $\tau$ of the FTN signaling.

9. A method performed at a receiver comprising:
partitioning a plurality of received symbols into K symbol streams, each one of the K symbol streams having been transmitted using Faster-than-Nyquist (FTN) signaling at a respective power;
performing demodulation and decoding of the K symbol streams by:
(i) demodulating and decoding a $K^{th}$ symbol stream of the K symbol streams to obtain a $K^{th}$ set of bits, the $K^{th}$ symbol stream having been transmitted at a power greater than a power at which at least one other of the K symbol streams was transmitted;
(ii) mapping the $K^{th}$ set of bits to a $K^{th}$ set of symbols;
(iii) for each one of k=K −1, . . ., 1:
demodulating and decoding a $k^{th}$ symbol stream of the K symbol streams to obtain a $k^{th}$ set of bits, the demodulating and decoding including: performing interference cancellation using sets of symbols mapped from bits obtained from demodulating and decoding at least one of $(k+1)^{th}$ to $K^{th}$ symbol streams of the K symbol streams.

10. The method of claim 9, wherein the performing the demodulation and decoding of the K symbol streams comprises performing N iterations, wherein each iteration of the N iterations comprises steps (i) to (iii), and wherein for each one of n=2, . . ., N:
step (i) of the $n^{th}$ iteration comprises demodulating and decoding the $K^{th}$ symbol stream by performing operations including: interference cancellation using sets of symbols mapped from bits obtained from demodulating and decoding at least one of the $1^{st}$ to $K^{th}$ symbol streams during the $(n-1)^{th}$ iteration.

11. The method of claim 9, wherein for each one of k=2, . . . K:
the $k^{th}$ symbol stream was transmitted with a magnitude of power no less than a magnitude of the power used to transmit the $(k-1)^{th}$ symbol stream.

12. The method of claim 11, wherein for each one of k=2, . . . K:

the power that was applied to the $K^{th}$ symbol stream satisfies the relationship $$P_k \geq \frac{\rho\left(\sigma^2 + \sum_{i=1}^{k-1} \sum_{m=-\infty}^{m=\infty} |g[mK+i]|^2 P_{k-i}\right)}{|g[0]|^2(1+\rho) - \rho \sum_{m=-\infty}^{m=\infty} |g[mK]|^2}$$

where $P_k$ is the power that was applied to the $k^{th}$ symbol stream, $\rho$ is a signal-to-interference-plus-noise ratio at which an error control code achieves error-free performance, $\sigma^2$ is noise variance of a channel, and $g[n]=\int_{-\infty}^{\infty} h(t)h(t-n\tau T)\, dt$, where $\tau$ is a time acceleration factor of the FTN signaling, h(t) is a transmit pulse, and T is a duration of the transmit pulse.

13. The method of claim 9, wherein the K symbol streams each have a same coding and modulation.

14. A receiver comprising:

K branches, each branch of the K branches to receive a respective one of K symbol streams, each one of the K symbol streams having been transmitted using Faster-than-Nyquist (FTN) signaling at a respective power, and each branch having a respective demodulator and a respective forward error correction decoder;

the receiver configured to perform demodulation and decoding of the K symbol streams by:

(i) demodulating and decoding a $K^{th}$ symbol stream of the K symbol streams using the th respective demodulator and forward error correction decoder of $K^{th}$ branch to obtain a $K^{th}$ set of bits, the $K^{th}$ symbol stream having been transmitted at a power greater than a power at which at least one other of the K symbol streams was transmitted;

(ii) mapping the $K^{th}$ set of bits to a $K^{th}$ set of symbols;

(iii) for each one of k=K −1, . . ., 1:

demodulating and decoding a $k^{th}$ symbol stream of the K symbol streams using the respective demodulator and forward error correction decoder of the $k^{th}$ branch to obtain a $k^{th}$ set of bits, the demodulating and decoding including: performing interference cancellation using sets of symbols mapped from bits obtained from demodulating and decoding at least one of $(k+1)^{th}$ to $K^{th}$ symbol streams of the K symbol streams.

15. The receiver of claim 14, wherein the receiver is configured to perform the demodulation and decoding of the K symbol streams by performing N iterations, wherein each iteration of the N iterations comprises the receiver performing steps (i) to (iii), and wherein for each one of n=2, . . ., N:

step (i) of the $n^{th}$ iteration comprises the receiver demodulating and decoding the $K^{th}$ symbol stream by performing operations including: interference cancellation using sets of symbols mapped from bits obtained from demodulating and decoding at least one of the $1^{st}$ to $K^{th}$ symbol streams during the $(n-1)^{th}$ iteration.

16. The receiver of claim 14, wherein for each one of k=2, . . ., K:

the $k^{th}$ symbol stream was transmitted with a magnitude of power no less than a magnitude of the power used to transmit the $(k-1)^{th}$ symbol stream.

17. The receiver of claim 16, wherein for each one of k=2, . . ., K:

the power that was applied to the $k^{th}$ symbol stream satisfies the relationship $$P_k \geq \frac{\rho\left(\sigma^2 + \sum_{i=1}^{k-1} \sum_{m=-\infty}^{m=\infty} |g[mK+i]|^2 P_{k-i}\right)}{|g[0]|^2(1+\rho) - \rho \sum_{m=-\infty}^{m=\infty} |g[mK]|^2}$$

where $P_k$ is the power that was applied to the $k^{th}$ symbol stream, $\rho$ is a signal-to-interference-plus-noise ratio at which an error control code achieves error-free performance, $\sigma^2$ is noise variance of a channel, and $g[n]=\int_{-\infty}^{\infty} h(t)h(t-n\tau T)\, dt$, where $\tau$ is a time acceleration factor of the FTN signaling, h(t) is a transmit pulse, and T is a duration of the transmit pulse.

18. The receiver of claim 14, wherein the K symbol streams each have a same coding and modulation.

* * * * *